(12) United States Patent
Aizawa et al.

(10) Patent No.: US 6,474,169 B1
(45) Date of Patent: Nov. 5, 2002

(54) CORROSION-RESISTANT DIAPHRAGM PRESSURE SENSOR

(75) Inventors: Mituyoshi Aizawa, Tokyo (JP); Yoshinori Kawamura, Saitama-ken (JP)

(73) Assignee: Tem-Tech Lab Co., Ltd., Tokyo (JP)

(*) Notice: Subject to any disclaimer, the term of this patent is extended or adjusted under 35 U.S.C. 154(b) by 45 days.

(21) Appl. No.: 09/666,057

(22) Filed: Sep. 20, 2000

(30) Foreign Application Priority Data

Jul. 10, 2000 (JP) ......................................... 2000-208016

(51) Int. Cl.⁷ ................................................. G01L 7/08
(52) U.S. Cl. ......................................................... 73/715
(58) Field of Search ........................... 73/715–731, 706; 338/1–4; 361/283

(56) References Cited

U.S. PATENT DOCUMENTS 5,365,789 A * 11/1994 Totterdell et al. ............. 73/721
5,524,492 A * 6/1996 Frick et al. ................... 73/706

FOREIGN PATENT DOCUMENTS

JP 10213504 * 8/1998

OTHER PUBLICATIONS

Jack Doublet, Application of Thick Film Technology to Mechanical Quantities Measurement, 5 pages.

* cited by examiner

Primary Examiner—Benjamin R. Fuller
Assistant Examiner—Marissa Ferguson
(74) Attorney, Agent, or Firm—Wenderoth, Lind & Ponack, L.L.P.

(57) ABSTRACT

A diaphragm pressure sensor (1) includes a pressure guide member (3) made of fluoroplastics for the admission of liquid chemicals, pressure of which is measured. A pressure frame (4) made of perfluoroalkoxy resin is integrated with the pressure guide member (3) to form a wetted part 6 of the liquid chemicals. A ceramic diaphragm (8) with built-in pressure sensor (7) is bonded to the surface of the pressure frame (4) opposite to the surface to which pressure is applied. A body (2) is provided for housing the pressure guide member (3), pressure frame (4) and diaphragm (8).

10 Claims, 1 Drawing Sheet

Fig. 1A
Fig. 1B
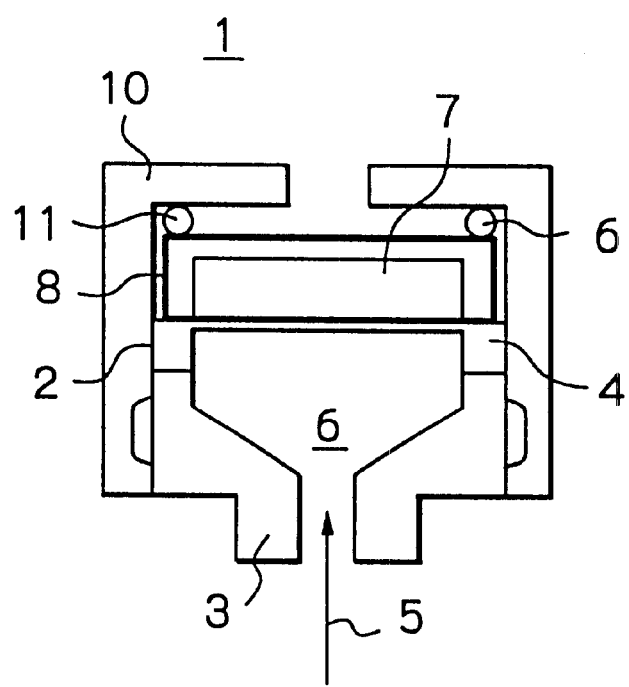
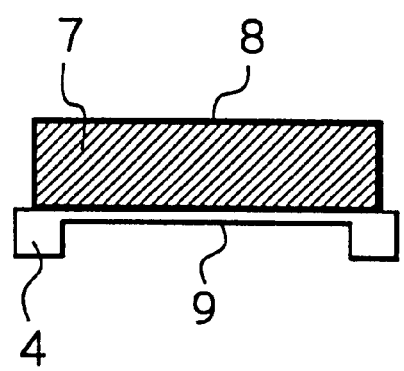

CORROSION-RESISTANT DIAPHRAGM PRESSURE SENSOR

BACKGROUND OF THE INVENTION

The present invention pertains generally to a pressure sensor and, more particularly, to a corrosion-resistant diaphragm pressure sensor used for liquid chemical containers, liquid chemical piping, etc.

In general, a diaphragm pressure sensor is constructed in such a way as to sense pressure by converting the displacement of a diaphragm generated by pressure applied to the diaphragm into an electronic signal. In particular, a diaphragm pressure sensor for sensing pressure of strong acid, strong alkaline liquid chemicals, etc. conventionally has had a diaphragm. The surface of the diaphragm can be coated with fluoroplastics, if the diaphragm is made of metal, or the diaphragm can be made of a highly corrosion-resistant material such as alumina ceramic, etc. with a view to minimization of corrosion by liquid chemicals such as mentioned above.

However, a metal diaphragm coated with fluoroplastics employed in a conventional diaphragm pressure sensor has a limited life due to poor uniformity of coating, pinholes, etc. Further, a diaphragm made of alumina ceramic, although it has satisfactory corrosion resistance properties, slightly dissolves in strong acid or strong alkaline liquid chemicals.

SUMMARY OF THE INVENTION

It is an object of the present invention to provide an improved diaphragm pressure sensor for sensing fluid pressure, characterized by excellent corrosion resistance to strong acid, strong alkaline liquid chemicals, etc.

A diaphragm pressure sensor of the present invention comprises a pressure guide member made of fluoroplastics for the admission of liquid chemicals, pressure of which is measured, and a pressure frame made of perfluoroalkoxy resin (pheno-lformaldehyde) integrated with the pressure guide member to constitute a container for holding the liquid chemicals. A ceramic diaphragm is provided for housing a pressure sensor portion, which is bonded to the surface of the pressure frame opposite to the surface against which pressures of the liquid chemicals are applied. A body houses the pressure guide member, pressure frame and diaphragm.

Since a diaphragm pressure sensor of the present invention does not have an O-ring, etc. as an airtight seal for liquid chemicals installed between a ceramic diaphragm housing a pressure sensor part and a liquid contact portion, it is free from leakage of liquid chemicals caused by deterioration of an O-ring, etc. Therefore, the diaphragm in the present sensor can be fully protected from highly-corrosive liquid chemicals.

Further, a pressure guide member made of perfluoroalkoxy resin and a pressure frame also made of perfluoroalkoxy resin in the present invention are integrated such that they form a single component made of perfluoroalkoxy resin. Therefore, the present sensor can achieve excellent corrosion-resistance to strong acid, strong alkaline liquid chemicals, etc.

BRIEF DESCRIPTION OF THE DRAWINGS

FIG. 1A shows a constitution of a diaphragm pressure sensor in accordance with the present invention, and FIG. 1B shows a detail of the ceramic diaphragm 8 and pressure frame 4.

DETAILED DESCRIPTION OF THE INVENTION

The drawings show a constitution of the diaphragm pressure sensor 1 of the present invention.

The pressure guide member 3 made of perfluoroalkoxy resin is fitted into the opening side of the body 2 of the diaphragm pressure sensor 1. The pressure frame 4 also made of perfluoroalkoxy resin is welded to the pressure guide member 3 such that the pressure frame 4 and pressure guide member 3 are integrated to form a wetted part 6 (liquid containing part) for containing liquid chemicals as is indicated by the arrow 5, pressure of which chemicals is measured.

The pressure sensor portion 7 comprises, for example, a strain resistance gauge deposited on the interior surface of the ceramic diaphragm 8, which interior surface is adjacent to the wetted part 6, such that the strain resistance gauge constitutes a part of a Wheatstone bridge. The pressure sensor portion 7 senses a fluid pressure by converting the displacement of the diaphragm 8 generated by pressure from the wetted part 6 of the liquid chemicals into the change in resistance, and then outputting the change as an electronic signal.

The diaphragm 8 and pressure frame 4 are bonded to each other by bonding a bonding surface of the ceramic diaphragm onto a sensing surface of the film-treated portion 9 of the pressure frame 4 opposite to the pressure-receiving surface to which pressure is applied. The surface of the diaphragm 8 is treated with perfluoroalkoxy resin for surface protection (indicated by slanting lines in the drawing).

In the past, it was believed that fluoroplastics such as perfluoroalkoxy resin, PTFE, etc. couldn't be bonded by bonding adhesive. However, the present inventors have found that if a small amount of organic amine compounds is added to a cyanoacrylate adhesive and the bonding surface of the ceramic diaphragm 8 is roughly worked (i.e., roughened), the pressure frame 4 made of fluoroplastics can be tightly bonded to the diaphragm 8.

The diaphragm 8 is fixed by the sensor holding portion 10 at the top of the body 2 and holding O-ring 11 so as to be stably contained in the body 2 of the diaphragm pressure sensor 1.

What is claimed is:

1. A diaphragm pressure sensor comprising:
   a pressure guide member formed of fluoroplastics material so as to receive liquid chemicals therein to be measured;
   a pressure frame formed of perfluoroalkoxy resin and having a film-treated portion, said pressure frame being integrally connected to said pressure guide member so as to form an integrated liquid-containing part for containing the liquid chemicals;
   a ceramic diaphragm having an integral pressure sensor, a bonding surface of said diaphragm being bonded to a sensing surface of said film-treated portion opposite a pressure-receiving surface of said film-treated portion, said bonding surface being roughened and bonded to said sensing surface by a cyanoacrylate adhesive having organic amine compounds therein; and
   a body housing said pressure guide member, said pressure frame, and said diaphragm.

2. The diaphragm pressure sensor of claim 1, wherein said pressure frame is welded to said pressure guide member.

3. The diaphragm pressure sensor of claim 2, wherein said diaphragm is coated with a perfluoroalkoxy resin film.

4. The diaphragm pressure sensor of claim 2, wherein said pressure frame is seal-welded to said pressure guide member so as to form a liquid-tight liquid-containing part.

5. The diaphragm pressure sensor of claim 4, wherein said diaphragm is coated with a perfluoroalkoxy resin film.

6. The diaphragm pressure sensor of claim 1, wherein said pressure frame is integrally connected to said pressure guide member so as to form a liquid-tight liquid-containing part.

7. The diaphragm pressure sensor of claim 6, wherein said diaphragm is coated with a perfluoroalkoxy resin film.

8. The diaphragm pressure sensor of claim 1, wherein said integral pressure sensor of said diaphragm comprises a strain resistance gauge.

9. The diaphragm pressure sensor of claim 8, wherein said diaphragm is coated with a perfluoroalkoxy resin film.

10. The diaphragm pressure sensor of claim 1, wherein said diaphragm is coated with a perfluoroalkoxy resin film.

* * * * *